US006779404B1

(12) United States Patent
Brincker et al.

(10) Patent No.: US 6,779,404 B1
(45) Date of Patent: Aug. 24, 2004

(54) METHOD FOR VIBRATION ANALYSIS

(76) Inventors: Rune Brincker, Charlottehøj 68, DK-9000, Aalborg (DK), 9000; Palle Andersen, Herning Vej 222, DK-9220, Aalborg Ø (DK), 9220

( * ) Notice: Subject to any disclaimer, the term of this patent is extended or adjusted under 35 U.S.C. 154(b) by 0 days.

(21) Appl. No.: 10/129,302
(22) PCT Filed: Nov. 3, 2000
(86) PCT No.: PCT/DK00/00609

§ 371 (c)(1),
(2), (4) Date: May 3, 2002

(87) PCT Pub. No.: WO01/33182

PCT Pub. Date: May 10, 2001

(30) Foreign Application Priority Data

Nov. 3, 1999 (DK) .......................................... 1999 01587

(51) Int. Cl.$^7$ .............................................. G01N 29/00
(52) U.S. Cl. .............................. 73/659; 73/660; 73/662
(58) Field of Search .......................... 73/659, 660, 662, 73/583, 586, 579, 597, 598, 600, 602; 702/182, 189, 56; 381/71

(56) References Cited

U.S. PATENT DOCUMENTS

| | | | |
|---|---|---|---|
| 3,710,082 A | | 1/1973 | Sloane et al. ............... 700/280 |
| 4,513,622 A | | 4/1985 | Uretsky ....................... 73/664 |
| 5,195,046 A | * | 3/1993 | Gerardi et al. ................ 702/35 |
| 5,365,594 A | * | 11/1994 | Ross et al. ................. 381/71.14 |
| 5,526,292 A | * | 6/1996 | Hodgson et al. ............ 700/280 |
| 5,612,495 A | * | 3/1997 | Shimada et al. ............... 73/579 |
| 5,656,779 A | * | 8/1997 | Bronowicki ................. 73/668 |
| 5,814,729 A | * | 9/1998 | Wu et al. ..................... 73/588 |
| 5,917,919 A | * | 6/1999 | Rosenthal ................. 381/71.11 |
| 6,208,949 B1 | * | 3/2001 | Eatwell ...................... 702/189 |
| 6,448,488 B1 | * | 9/2002 | Ekhaus et al. ................ 84/735 |

OTHER PUBLICATIONS

U.S. 2002/0183942, Modal analysis method and apparatus therefor, 12/05 2002.*
Prevosto, M.; *Algorithmes d'identification des caracteristics de structures mecaniques complexes*; Ph.D Thesis, Univ. of Rennes I, France; Mar. 1982 (in French).
Prevosto et al.; *Frequency versus time domain identification of complex structures model shapes under natural excitation*; SINTEF; Trondheim, Norway; pp. 514–23 (Jul. 25–29, 1983) Pub. 1984.
Vold et al.; *A Multi–input Estimation Algorithm for Mini–computers*; Proceedings of SAE International Congress & Expo, Detroit, MI, Feb. 22–26, 1982; SAE Technical Series 820194.
Van Overschee, P. & DeMoor, B.; *Subspace Identification for Linear Systems; Theory, Implemnnentation, Application*; 1996; Kluwer Academic Publishers, Norwell, MA; (Full Publication: 254 pages).
Bendat et al.; *Engineering Applications of Correlation and Spectral Analysis: Sect. 7.4, System Identification from Output Measurements*; John Wiley & Son(Wiley Interscience Publications), 1980: pp. 180–187.

(List continued on next page.)

Primary Examiner—Hezron Williams
Assistant Examiner—Jacques M. Saint-Surin
(74) Attorney, Agent, or Firm—James Creighton Wray; Meera P. Narasimhan

(57) ABSTRACT

Output-only modal testing of an object. Vibrations are excited in said object and measured by a number of vibration sensitive detectors. From the data of the measurements, a spectral density matrix function is determined. From this density matrix, auto spectral densities for the individual modes are identified performing a decomposition based on the Singular Value Decomposition technique. From the auto spectral densities of the individual modes, natural frequencies and damping ratios for the modes can be estimated, and from the singular vectors of the Singular Value Decomposition, the modes shapes can be estimated.

10 Claims, 10 Drawing Sheets-

OTHER PUBLICATIONS

Felber, Andreas J.; *Development of a Hybrid Bridge Evaluation System*; Ph. D Thesis, The University of British Columbia; 1993.

Ibrahim & Mikulcik; *The Experimental Determination of Vibration Parameters from Time Responses*; Shock and Vibration Bulletin; 1976; vol. 46, No. 5: pp. 187–196.

Juang & Pappa; *An Eigensystem Realization Algorithm for Modal Parameter Identification and Model Reduction*; J. Guidance: vol. 8, No. 5: Sep.–Oct. 1985; pp. 620–627.

Shih et al.; *Complex Mode Indication Function and its Application to Spatial Domain Parameter Estimation*; Mechanical Systems and Signal Processing, vol. 2, No. 4; 1988, pp. 367–377.

Shih et al.; *A Frequency Domain Global Parameter Estimation Method for Multiple Reference Frequency Response Measurements*; Mechanical Systems and Signal Processing, vol. 2, No. 4; 1988, pp. 349–365.

Allemang & Brown; *A Correlation Coefficient for Modal Vector Analysis*; Proc. of International Modal Analysis Conference (IMAC); 1982; Orlando, FL; pp. 110–116.

Andersen et al.; *Theory of Covariance Equivalent ARMAV Models of Civil Engineering Structures*; Proc. of IMAC, 1996; Dearborn, MI; pp. 518–524.

* cited by examiner

METHOD FOR VIBRATION ANALYSIS

This application claims the benefit of Danish Application No. PA 1999 01587 filed Nov. 3, 1999 and PCT/DK00/00609 filed Nov. 3, 2000.

BACKGROUND OF THE INVENTION

1. Field of the Invention

The present invention relates to a method for vibration analysis according to the preamble of claim 1.

2. Background of the Invention

Modal identification is the process of estimating modal parameters from vibration measurements obtained from different locations of a structure. The modal parameters of a structure include the mode shapes, natural (or resonance) frequencies and the damping properties of each mode that influence the response of the structure in a frequency range of interest.

Modal parameters are important because they describe the inherent dynamic properties of the structure. Since these dynamics properties are directly related to the mass and the stiffness, experimentally obtained modal parameters provide information about these two physical properties of a structure. The modal parameters constitute a unique information that can be used for model validation, model updating, quality control and health monitoring.

In traditional modal analysis the modal parameters are found by fitting a model to the Frequency Response Function relating excitation forces and vibration response. In output-only modal analysis, the modal identification is performed based on the vibration responses only and a different identification strategy has to be used.

Output-only modal testing and analysis is used for civil engineering structures and large mechanical structures or structures m operation that are not easy to excite artificially.

Large civil engineering stares are not easily excited and they are often loaded by natural (ambient) loads that cannot easily be controlled or measured. Examples of such loads include wave loads on offshore structures, wind loads on buildings and traffic loads on bridges in such cases it is an advantage just to measure the natural (or ambient) responses and then estimate the modal parameters by performing an output-only modal identification. For civil structures the technique is often referred to as ambient response testing and ambient response analysis.

Application of output-only modal identification instead of traditional modal identification gives the user some clearly defined benefits in case of large structures and natural loading. Rather than loading the structure artificially and considering the natural loading as an unwanted noise source, the latter is used as the loading source. The main advantages of this technique are:

Testing is less time consuming since equipment for exciting the structure is not needed.

Testing does not interrupt the operation of the structure.

The measured response is representative of the real operating conditions of the structure.

When performing output-only modal identification of a structure, the user can perform the identification in the time domain or in the frequency domain. For output only identification, the time domain techniques have been rather dominating since no accurate techniques for frequency domain identification exists. However, since the frequency domain supports the physical intuition of the system, i.e. the user can observe the spectral densities and, thus, directly have an idea of the modes of the system by regarding the spectral peaks, simple and rather approximate techniques have been widely accepted for preliminary analysis. The most well-known frequency domain technique is the so-called classical approach, also denoted the basic frequency method, or the peak picking method, where the user simply chooses one of the frequency lines in the spectrum at the appearing peak as the natural (resonance) frequency and then estimates the corresponding mode shape as one of the columns of the spectral density matrix.

The classical approach is based on simple signal processing using the Discrete Fourier Transform, and is using the fact that well-separated modes can be estimated directly from the spectral density matrix at the peak, as shown in by Julius S. Bendat and Allan G. Piersol in "Engineering Applications of Correlation and Spectral Analysis", John Wiley & Sons, 1993.

Other implementations of the technique make use of the coherence between channels as described by A. J. Felber in "Development of a Hybrid Bridge Evaluation System", Ph.D. thesis, Department of Civil Engineering, University of British Columbia, Vancouver, Canada, 1993. The term channel is commonly used for the output data of a sensor.

The main advantage of the classical approach compared to other approaches, such as two-stage time domain identification technique, or the one-stage time domain identification techniques, for example the Stochastic Subspace Identification algorithms is its user-friendliness. It is fast, simple to use, and gives the user a "feeling" of the data he or she is dealing with.

The two-stage time domain has been described by H. Vold, J. Kundrat, G. T. Rocklin, and R. Russel in "A Multi-Input Modal Estimation Algorithm For Mini-Computer", SAE Technical Paper Series, No. 820194, 1982; by S. R. Ibrahim and E. C. Milkulcik in "The Experimental Determination of Vibration Test Parameters From Time Responses", The Shock and Vibration Bulletin, Vol. 46, No. 5, 1976, pp. 187–196; and by J.-N. Juang and R. S. Papa in "An Eigensystem Realization Algorithm For Modal Parameter Identification And Modal Reduction", J. of Guidance, Control and Dynamics, Vol. 8, No. 5, 1985, pp. 620–627. The Stochastic Subspace Identification algorithms is described by P. Van Overschee and B. De Moor in "Subspace Identification for Linear Systems", Kluwer Academic Publishers, 1996, The classical technique gives reasonable estimates of natural frequencies and mode shapes if the modes are well-separated. However, in the case of close modes, it can be difficult to detect the close modes, and even in the case where close modes are detected, estimates becomes heavily biased by simple estimation of the mode shapes from one of the columns of the spectral matrix.

Further, the frequency estimates are limited by the frequency resolution of the spectral density estimate, and in all cases, damping estimation is uncertain or impossible.

SUMMARY OF THE INVENTION

It is the purpose of the invention to provide a frequency domain method for vibration analysis, i.e. output-only modal analysis, without these disadvantages, but where the user-friendliness is preserved.

This purpose is achieved by a method as mentioned by way of introduction and characterised as described in the characterising part of claim 1.

The invention significantly reduces the uncertainty in the estimation of vibrational modes of an object. Due to its user friendliness and fast obtainable results, the invention is a substantial improvement for output-only modal analysis, where the only major difference between modal parameters estimated from traditional modal testing and output-only modal analysis is that the output-only modal analysis yields unscaled mode shapes.

In the invention, it is assumed that the object has been excited over a broad frequency range by a signal, which has the same intensity at all frequencies. This kind of excitation is called white noise. As a consequence of the assumption with regard to the input excitation as white noise, the analysis according to the invention is directed to the response of the object and uses therefore the well-known term called output-only modal analysis.

A number of techniques are used in the invention. One is the so called Frequency Domain Decomposition (FDD) which is known from, among others, traditional modal analysis, where the structure is loaded by a known input However, in the case of traditional modal analysis the system matrix that is decomposed is not the spectral density matrix describing the responses, but the frequency response function (FRF) matrix relating input and output of the system.

As a second technique, the present invention uses the so-called Singular Value Decomposition (SVD) to perform the frequency domain decomposition of the spectral matrix. The SVD is known from numerical mathematics and is used in a number of different applications. However, the main application of this decomposition is to determine the rank of a matrix. In traditional modal analysis, the technique is mainly used to find the number of modes, but can also be used to estimate modal properties as described in Shih, C. Y., Y. G. Tsuei, R. J. Allemang and D. L. Brown: "Complex Mode Indicator Function and its Applications to Spatial Domain Parameter Estimation", Mechanical Systems and Signal Proc., Vol. 2, No. 4, 1988 and in Shih, C. Y., Y. G. Tsuei, R. J. Allemang and D. L. Brown: "A Frequency Domain Global Parameter Estimation Method for Multiple Reference Frequency Response Measurements", Mechanical Systems and Signal Proc., Vol. 2, No. 4, 1988.

A third technique applied in the analysis of singular value decomposed spectral density functions is the modal assurance criterion (MAC) which is known from traditional modal analysis and described in Allemang, R. J. and D. L. Brown: "A Correlation Coefficient for Modal Vector Analysis", Proc of the $1^{st}$ International Modal Analysis Conference, IMAC, Orlando, Fla., USA, 1982. In the present invention it is used to isolate auto spectral density functions of the individual modes.

In order to estimate vibrational modes of an object, measurements are performed in a vibrational excited object using a number of spatially distributed vibration sensitive detectors. For example, a building can be exposed to a broad range of excitation frequencies due to wind or traffic, justifying the assumption of excitation by white noise.

At suitable predetermined locations, vibration sensitive detectors, for example accelerometers, are attached to the object and their response is measured and transformed to data which are stored in a suitable medium, for example a computer memory.

Those data are subject to further analysis, where the initial step is to achieve a spectrum equivalent to a spectral density function. This spectral density function is decomposed into auto spectral densities by a technique involving the modal assurance criterion (MAC), where the auto spectral densities can be interpreted as corresponding to independent vibrational modes. Then, the auto spectral densities are transformed from frequency domain to time domain in order to estimate damping and more accurate natural frequencies.

Though the method itself in practice is relatively simple to use leading to results in a fast way without the need of cumbersome calculations, the theory behind the method is not obvious and, therefore, one of the major achievements of the invention. Only a thorough theoretical treatment of the mathematical problem behind the theory leads to the method according to the invention, which is the reason for a detailed explanation of the theory in the following. After the theoretical approach, a practical approach of the method according to the invention will be given followed by examples for illustration.

When measuring the response of a structure, the response is sampled, it means that the signal is observed at discrete times, each of the observation times is spaced in time with the sampling interval $\Delta t$, and usually a number of observations of the response is obtained in a set of spatially distributed locations on the structure. When estimating the spectral density of the response, the spectral density is observed in a frequency band from zero frequency to the half of the sample frequency $f_s = 1/\Delta t$. In this frequency band the response of the structure is influenced by the long on the structure and by the dynamic modes in that frequency interval. This means, that the spectral matrix of the response of a structure is a combination of the responses of the modes that is present in the observed frequency band. In the following, it is shown that taking the Singular Value Decomposition (SVD) of the spectral matrix, the spectral matrix is decomposed into a set of auto spectral density functions, each corresponding to a single degree of freedom (SDOF) system. Each SDOF system corresponds to a certain mode of the system, i.e., instead of dealing with the more complicated combination of all modes and all the different spectral densities between the responses of the different locations of observation on the structure, the problem is reduced to dealing with auto spectral densities of the modal responses of the system. This result is exact in the case where the loading is white noise, the structure is lightly damped, and when the mode shapes of close modes are geometrically orthogonal. If these assumptions are not satisfied, the decomposition into SDOF systems is approximate, but still the results are significantly more accurate than the results of the classical frequency domain approach The SDOF auto spectral densities are identified using the known modal assurance criterion (MAC).

Theoretical Background

Obtaining a set of data from one of the detectors attached to the object of interest yields a set of time related measurements $\{(y_1, t_1), (y_2, t_2), \ldots (y_n, t_n)\}$, where $y_n$ is the detector measurement at time $t_n$. These measurements are in the following called the system response. The unknown excitation that has generated this system response is in the following denoted $x_n$.

Determining the Spectral Density Function

From this set of measured system response, a frequency dependent spectral density function can be obtained by Fast Fourier Transform (FFT), which is a traditional approach. Assume that the system response has been measured at m locations on the object $y_n$ is then an m×1 vector. Also assume that the Gaussian white noise excitation has been applied in r locations, which imply that $x_n$ is a r×1 vector.

Due to the assumptions that the unknown excitation $x_n$ is Gaussian white noise, the m×m spectral density function $G_{yy}(i\omega)$ of the system response will in the following be defined as $$G_{yy}(i\omega)=H(i\omega)G_{xx}H(i\omega)^H \quad -\infty<\omega<\infty \quad (1)$$

$H(i\omega)$ is the m×r Frequency Response Function (FRF) matrix that relate the applied Gaussian white noise excitation to the system response. The superscript H denotes the Hermitian transpose, i.e. complex conjugate and transpose. The spectral density function $G_{xx}$ of the Gaussian white noise excitation is a constant matrix indicating that all frequencies have been equally excited. The spectral density function reflects the predominant vibration frequencies ω that occur as peaks in the spectral density function. Since $G_{xx}$ is a real and symmetric matrix $G_{yy}(i\omega)$ will always be Hermitian, i.e. the elements below the diagonal is the complex conjugates of the corresponding elements above the diagonal.

However, this method when applied to measured data suffers from the introduction of the so-called "leakage" biasing in the density spectrum due to the assumption of periodic data when performing the FFT. This biasing results in a flattening of the before mentioned peaks in the spectral density function. To avoid this biasing, it is possible to calculate the covariance function for the data set first before a Fast Fourier Transform. To obtain an unbiased estimate of the covariance function however, a tedious calculation is involved.

Therefore, another method for spectral estimation is proposed and application of this method together with above mentioned frequency domain decomposition is a part of the invention. The method that is used is a combination of traditional FFT and a technique denoted Random Decrement Transform (RDT). First, a covariance function is estimated using the RDT technique, and then, the covariance function is transformed to frequency domain by the FFT. Since the covariance function is a decaying function in time, it is well known that by performing FFT on this covariance function instead of the data itself, the leakage bias of the resulting spectral density function will be significantly decreased. In fact, if the covariance function has decreased to zero at half of the maximum time lag, then the leakage bias is exactly zero.

The advantages of using the RDT technique are:

Instead of performing time consuming multiplication, as is necessary for traditional covariance function estimation, the RDT uses only additions which are much faster calculations for normal computers;

Instead of being constrained by being forced to use all the signal in one way only, the user can weight the different parts of the time signal by using different kinds of trigger level, where the trigger level is explained in the following below;

Instead of getting only one estimate of the covariance function, the user gets two independent estimates, one for the covariance function itself, and one for its derivative.

It has to be mentioned here that modes at higher frequencies are weighted more, if the covariance function in the above method is replaced by the derivative of the covariance function. Therefore, in some cases, using the derivative of the covariance function can be an advantage.

When the user of the RDT technique is to perform an estimate of the covariance function, he has to choose a so-called trigger criterion. The trigger criterion can for instance be that the signal is within a certain intensity range. Then, if the signal is within this range, the technique selects the data around the time where the trigger criterion is satisfied, and incorporates these data in the estimation process. Thus, the user has the possibility to estimate one covariance function for low amplitudes and one for large amplitudes. This is of importance in cases where the user might want to investigate whether the structure under consideration has been subject to vibrations with such large amplitudes, that the structural response has been become non-linear, i.e. parts of the structure has been yielding (steel) or cracking (concrete or masonry). In this case, if the structural response is non-linear, the user will observe a difference of the spectral density function estimates for the low and for the high amplitudes.

The RDT technique is a well known technique for estimation of system time functions. However, it is not common to transform the time functions to frequency domain, and the above mentioned advantages by doing so are not known.

Once, the spectral density function has been obtained the following tools are applied.

Theoretical Background of Frequency Domain Decomposition

Assume that the spectral density function $G_{yy}(i\omega)$ of the system response has been estimated at discrete frequencies $\omega=\omega_j$, for $\omega_j \geq 0$. $G_{yy}(i\omega)$ is then described by a set of spectral density matrices, one for each of the discrete frequencies.

Consider the Hermitian spectral density matrix for $\omega=\omega_j$. This matrix is then decomposed by taking the Singular Value Decomposition (SVD) of the matrix $$G_{yy}(i\omega_j)=U_j S_j U_j^H = s_{j1}u_{j1}u_{j1}^H + s_{j2}u_{j2}u_{j2}^H + \ldots, + s_{jm}u_{jm}u_{jm}^H \quad 0\leq\omega\leq\infty \quad (2)$$

where the matrix $U_j=[u_{j1},u_{j2},\ldots,u_{jm}]$ is a unitary matrix holding the orthogonal singular vectors $u_{jk}$ as its columns, and $S_j$ is a diagonal matrix holding the scalar singular values $s_{jk}$. The singular values and corresponding vectors are always sorted so that the $s_{j1}$ always will be the largest. This decomposition is performed for all the estimated spectral density matrices.

Near a peak, corresponding to one mode, the Eigenvalue of that mode becomes dominating resulting in a loss of rank of the spectral matrix at that particular frequency. This loss of rank is detected by the SVD by a similar loss of singular values having values significantly different from zero. If only one mode is completely dominating at a specific frequency $\omega=\omega_j$, only $s_{j1}$ will be significantly different from zero. As shown below, an estimate of the mode shape of this dominating mode is given by the corresponding singular vector $u_{j1}$ assuming that the mode is lightly damped. The mode shape is the observable part of the Eigenvector that is associated with the dominating Eigenvalue.

If two close modes are dominating at $\omega=\omega_j$ then $s_{j1}$ and $s_{j2}$ will both be significant different from zero and corresponding mode shapes are given by the singular vectors $u_{j1}$ and $u_{j2}$ assuming that the mode shapes are orthogonal as $u_{j1}$ and $u_{j2}$ by definition are. This approach can in principle be extended to as many close modes as there are measurement channels m.

It is only at the peak of a dominating mode that $u_{j1}$ will be the mode shape estimate. When moving away from the peak, the influence of the Eigenvalues of the other modes start to interfere. This means that the singular vector that is an estimate of the mode shape now can be any one of the singular vectors. However, by using the so-called Modal Assurance Criterion (MAC) it is possible to track which of the singular vectors that currently matches the $u_{j1}$ at the peak. From this tracking it is then possible to determine which singular values that relates to the mode at the peak, and in this way construct the auto spectral density function of the particular mode. Due to the presence of noise it might not be possible to track the corresponding singular vectors over the hole frequency range. In this case the untracked part of the auto spectral density function is simply set to zero.

That statement that the first singular vector is an estimate for the mode shape can be verified by the following proof Let "−" and superscript T denote complex conjugate and transpose, respectively. The FRF can then be written in partial fractions, i.e. pole/residue form $$H(i\omega) = \sum_{k=1}^{n} \frac{R_k}{i\omega - \lambda_k} + \frac{\overline{R}_k}{i\omega - \overline{\lambda}_k} \quad -\infty \leq \omega \leq \infty \quad (3)$$

where n is the number of modes. $\lambda_k$ is the Eigenvalue (pole) and $R_k$ is the m×r residue matrix $$R_k = \phi_k \gamma_k^T \quad (4)$$

where $\phi_k, \gamma_k$ is the mode shape vector and the modal participation vector, respectively. By inserting (3) into (1) the following relation is obtained $$G_{yy}(i\omega) = \quad (5)$$

$$\sum_{k=1}^{n} \sum_{s=1}^{n} \left[ \frac{R_k}{i\omega - \lambda_k} + \frac{\overline{R}_k}{i\omega - \overline{\lambda}_k} \right] G_{xx} \left[ \frac{R_s}{i\omega - \lambda_s} + \frac{\overline{R}_s}{i\omega - \overline{\lambda}_s} \right]^H \quad -\infty \leq \omega \leq \infty$$

By multiplying the two partial fraction factors, and making use of the Heaviside partial fraction theorem, the spectral density function $G_{yy}(i\omega)$ can, after some mathematical manipulations, be reduced to a pole/residue form as follows $$G_{yy}(i\omega) = \quad (6)$$

$$\sum_{k=1}^{n} \frac{A_k}{i\omega - \lambda_k} + \frac{\overline{A}_k}{i\omega - \overline{\lambda}_k} + \frac{B_k}{-i\omega - \lambda_k} + \frac{\overline{B}_k}{-i\omega - \overline{\lambda}_k} \quad -\infty \leq \omega \leq \infty$$

where $A_k$ and $B_k$ are the k'th residue matrices of the spectral density function $G_{yy}(i\omega)$. The contribution from the $B_k$ elements is much smaller than the contribution from the $A_k$ elements and will in the following be regarded as negligible.

As the spectral density function $G_{yy}(i\omega)$ itself the residue matrices are m×m Hermitian matrices.

The residue matrix $A_k$ is given by $$A_k = R_k G_{xx} \left( \sum_{s=1}^{n} \frac{R_s}{-\overline{\lambda}_k - \lambda_s} + \frac{\overline{R}_s}{-\overline{\lambda}_k - \overline{\lambda}_s} \right)^H \quad (7)$$

The contribution to the residue from the k'th mode is given by $$A_k = \frac{R_k G_{xx} R_k^H}{2(2\pi f_k \zeta_k)} \quad (8)$$

where the denominator of (8) is two times minus the teal part of the Eigenvalue $\lambda_k = -2\pi f_k \zeta_k + i 2\pi f_k \sqrt{1-\zeta_k^2}$ with $f_k, \zeta_k$ being the natural frequency and damping ratio, respectively. As it appears, this term becomes dominating when the damping is light, i.e. when $\zeta_k$ tends to zero. Thus, is case of fight damping, the residue becomes proportional to the mode shape vector $$A_k \propto R_k G_{xx} R_k^H = \phi_k \gamma_k^T G_{xx} \overline{\gamma}_k \phi_k^H = d_k \phi_k \phi_k^H \quad (9)$$

where $d_k$ is a scalar constant that is non-negative since $G_{xx}$ always will be at least semi-definite.

At a certain frequency $\omega$, only a limited number of modes will contribute significantly, typically one or two modes. Let this set of modes be denoted by Sub($\omega$). Thus, in the case of a lightly damped object, the spectral density function $G_{yy}(i\omega)$ can always be written $$G_{yy}(i\omega) = \sum_{k \in Sub(\omega)} \frac{d_k \varphi_k \varphi_k^H}{i\omega - \lambda_k} + \frac{\overline{d}_k \overline{\varphi}_k \varphi_k^T}{i\omega - \overline{\lambda}_k} \quad -\infty \leq \omega \leq \infty \quad (10)$$

Now (10) describes the spectral density function from $-\infty$ to $\infty$. However, in practice, only the positive part of the spectral density function is considered, which reduces (10) to $$G_{yy}(i\omega) = \sum_{k \in Sub(\omega)} \frac{d_k \varphi_k \varphi_k^H}{i\omega - \lambda_k} = \sum_{k \in Sub(\omega)} \frac{d_k}{i\omega - \lambda_k} \varphi_k \varphi_k^H \quad 0 \leq \omega \leq \infty \quad (11)$$

This is a modal decomposition of the spectral matrix. The expression is similar to the results one would get directly from (2) under the assumption of independent white noise input, i.e. a diagonal spectral input matrix. For each frequency and each eigenvalue, value, the ratio in front of the mode shape product in (11) will be a positive constant that can always be made real by proper scaling of the corresponding mode shapes.

Identification Algorithm

Near a peak corresponding to the k th mode in the spectrum say at $\omega = \omega_j$, this mode or maybe a possible close mode will be dominating. If only the k th mode is dominating, there will only be one term in (11). Thus, in this case, the first singular vector $u_{j1}$ is an estimate of the mode shape $$\hat{\phi} = u_{j1} \quad (12)$$

and the corresponding singular value is the current value of auto power spectral density function of the corresponding single degree of freedom system at that specific frequency, refer to (11).

Define the MAC value between two vectors as $$MAC(\hat{\phi}, u_{nm}) = \frac{|\hat{\phi}^H u_{nm}|}{\sqrt{\hat{\phi}^H \hat{\phi}} \sqrt{u_{nm}^H u_{nm}}} \quad (13)$$

This value describes the correlation between the two vectors. If the vectors are similar except for a constant scaling the MAC value is 1. If they are complete orthogonal the value will be 0.

Using the MAC value in (13) the rest of the auto spectral density function is identified around the peak by comparing the mode shape estimate $\hat{\phi}$ in (12) with the singular vectors for the frequency lines around the peak. As long as a singular vector $u_{nm}$ is found that has MAC value near 1 with $\hat{\phi}$, the corresponding singular value belongs to the auto spectral density function of that specific mode If at a certain distance firm the peak of the mode none of the singular values has a singular vector with a MAC value larger than a certain limit value Ω, the search for matching parts of the auto spectral density function is terminated. The remaining unidentified part of the auto spectral density function is set to zero. From this fully or partially identified auto spectral density function of the SDOF system, the natural frequency and the damping are obtained by taking the auto spectral density function back to time domain by inverse discrete Fourier transform.

From the free decay time domain function, which is also the auto correlation function of the SDOF system of the k th mode, the natural frequency and the damping ratio is found by estimating crossing times and logarithmic decrement First, all extremes $r_n$, both peaks and valleys, on the auto correlation function are found. The logarithmic decrement δ is then given by $$\delta = \frac{2}{n}\ln\left(\frac{r_0}{|r_n|}\right) \quad (14)$$

where $r_0$ is the initial value of the auto correlation function and $r_n$ is the n th extreme. Thus, the logarithmic decrement and the initial value of the correlation function can be found by linear regression on nδ and $2\ln(|r_n|)$, and the damping ratio is given by the well known formula $$\zeta_k = \frac{\delta}{\sqrt{\delta^2 + 4\pi^2}} \quad (15)$$

A similar procedure is adopted for determination of the natural frequency. The natural frequency is found by making a linear regression on the crossing times and the times corresponding to the extremes and using that the damped natural frequency $f_k^d$ and the undamped natural frequency $f_k$ is related by $$f_k = \frac{f_k^d}{\sqrt{1-\zeta_k^2}} \quad (16)$$

The extreme values and the corresponding times are found by quadratic interpolation, whereas the crossing times where found by linear interpolation.

BRIEF DESCRIPTION OF THE DRAWINGS

Having described the theory behind the method according to the invention, the invention will be explained further in detail with reference to the following drawing, where.

DETAILED DESCRIPTION OF THE PREFERRED EMBODIMENTS

The technique according to the invention and as described above is illustrated on a case with two closely spaced modes in the density spectrum. The response of a two-degree-of-freedom system is simulated using a vector ARMA model as described by P. Andersen, R. Brincker, and P. H. Kirkegaard in "Theory of Covariance Equivalent ARMAV Models of Civil Engineering Structures", Proc of the 14$^{th}$ International Modal Analysis Conference, IMAC, Dearborn, 1996. Furthermore, it is assumed that these two degrees of freedom are loaded by Gaussian distributed white noise uncorrelated processes. The output of the simulation is a realisation of system response in two channels, i.e. theoretical data sets from only two detectors are regarded.

Figure 1:
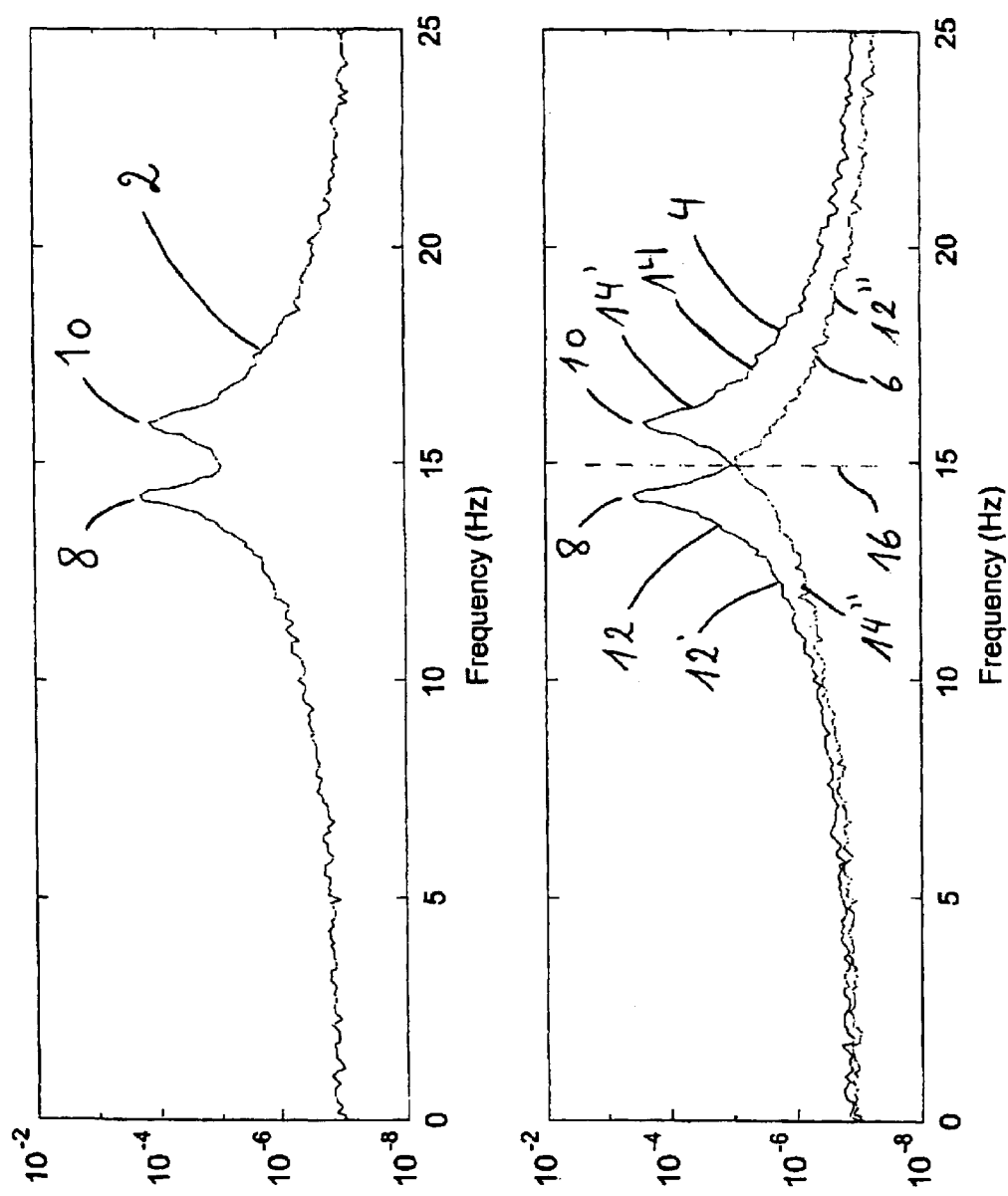
FIG. 1 shows a density spectrum with two close modes.
Figure 2:
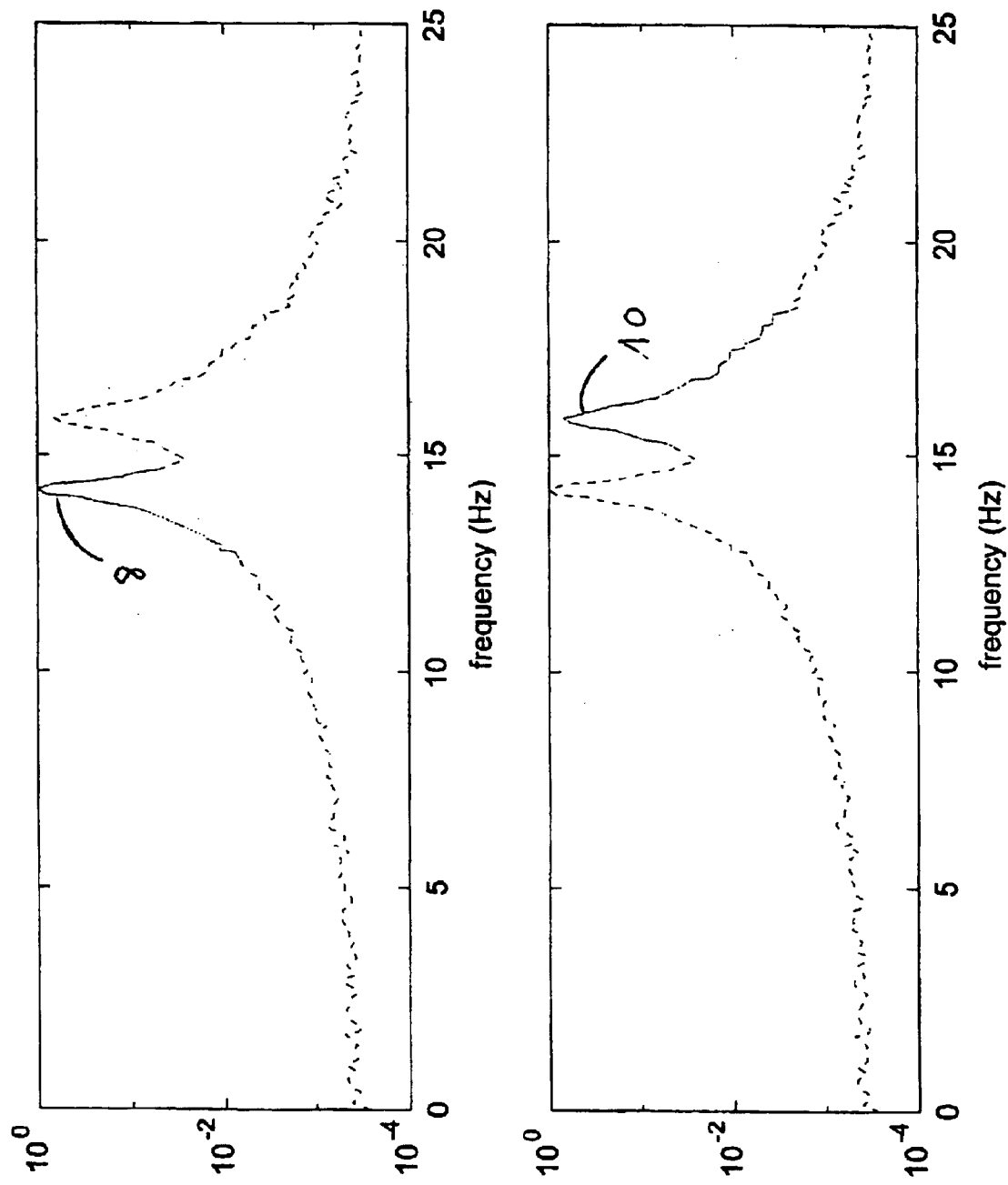
FIG. 2 shows a partial identification of the two peaks from FIG. 1.

The first case considered is a case with a reasonable spacing between the two modes. The spectral density function 2 of the system response of the first of the two channels is shown in the top spectrum of FIG. 1, and the singular values 4, 6 of the decomposed spectral density functions, which corresponds to the spectral density matrix, dependent on frequency are shown in the bottom spectrum of FIG. 1. As it appears, the two modes 8, 10 are clearly visible as peaks in both spectra Partial identifying of the auto spectra) density functions of the two SDOF systems using the MAC as described above yields the result as shown in FIG. 2, where each of the peaks 8, 10 are identified. The two single modes of the system can now be identified by the auto spectral density functions 12 and 14. These auto spectral density functions 12 and 14 as illustrated in FIG. 1 approximate to a very high degree the more theoretical SDOF auto spectral density functions and will in the following be treated as being the SDOF auto spectral density functions. The first single mode illustrated by the first auto spectral density function 12 corresponds approximately to the combination of that part 12' of the first singular value 4 which is to the left the line 16 at 15 Hz and that part 12" of the second singular value 6 which is to the right of the line 16 at 15 Hz. In analogy, the second single mode illustrated by the second auto spectral density function 14 corresponds approximately to the right part 14' of the first singular value 4 and the left part 14" of the second singular value 6.

Figure 3:
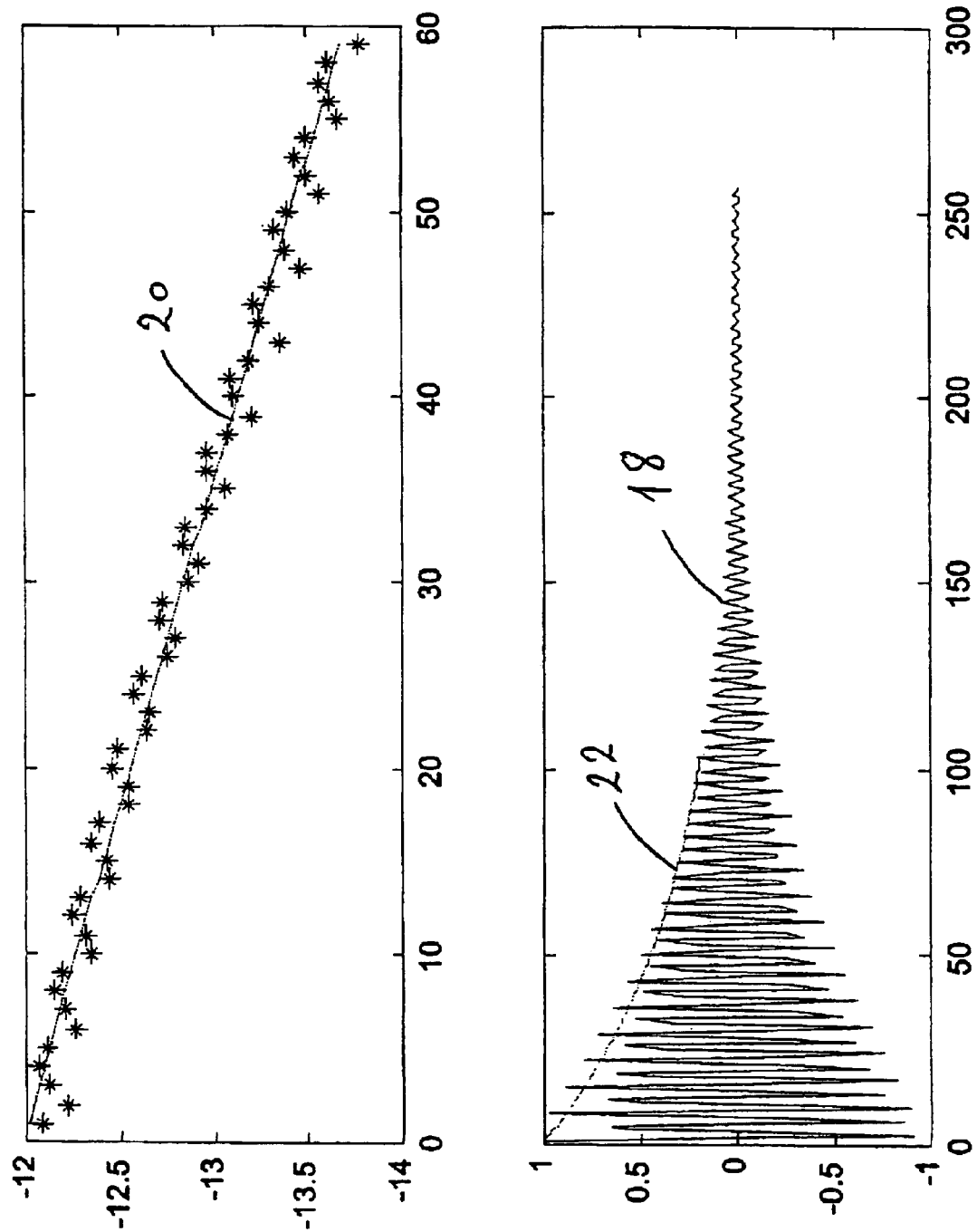
FIG. 3 shows a linear regression on extremes for estimation of damping (top), the time domain free decay obtained by inverse FFT, and an estimated damping envelope (bottom)

Taking the inverse discrete Fourier transform of the above partially identified SDOF auto spectral density function 12 of the first mode yields the corresponding auto correlation function estimate 18 as shown in FIG. 3, bottom. Top part of the same figure shows the linear regression on the extremes. The straight line 20 is the best fit line in a least squares sense. The so-called damping envelope 22 as shown in the bottom part of the figure is obtained by an exponential calculation with the values of the straight line 20 as arguments. The estimated damping envelope 22 is congruent with the positive extreme values of the auto correlation function 18.

As it appears, the procedure is quite straight forward and the user has a clear impression of the validity of the estimation simply by inspecting the plots.

Exact and identified natural frequencies and damping ratios are shown in Tables 1 and 2 for this first case and for the four other cases as described in the following. $f_1$ and $f_2$ are the frequencies for the first and the second single modes with corresponding damping ratios $\zeta_1$ and $\zeta_2$.

TABLE 1

Exact and estimated natural frequencies

| Case | Exact $f_1$ (Hz) | Exact $f_2$ (Hz) | Estimate $\hat{f}_1$ (Hz) | Estimate $\hat{f}_2$ (Hz) |
| --- | --- | --- | --- | --- |
| 1 | 14.235 | 15.916 | 14.241 | 15.907 |
| 2 | 15.532 | 15.916 | 15.508 | 15.896 |
| 3 | 15.532 | 15.916 | 15.526 | 15.888 |
| 4 | 14.309 | 15.834 | 14.433 | 15.679 |
| 5 | 14.235 | 15.916 | 14.226 | 15.931 |

TABLE 2

Exact and estimated damping ratios.

| Case | Exact $\zeta_1$ (%) | Exact $\zeta_2$ (%) | Estimate $\hat{\zeta}_1$ (%) | Estimate $\hat{\zeta}_2$ (%) |
| --- | --- | --- | --- | --- |
| 1 | 0.894 | 1.000 | 0.913 | 1.164 |
| 2 | 0.976 | 1.000 | 0.966 | 0.938 |
| 3 | 0.976 | 1.000 | 0.670 | 0.579 |
| 4 | 2.225 | 2.539 | 2.589 | 3.113 |
| 5 | 0.894 | 1.000 | 1.083 | 0.986 |

Figure 4:
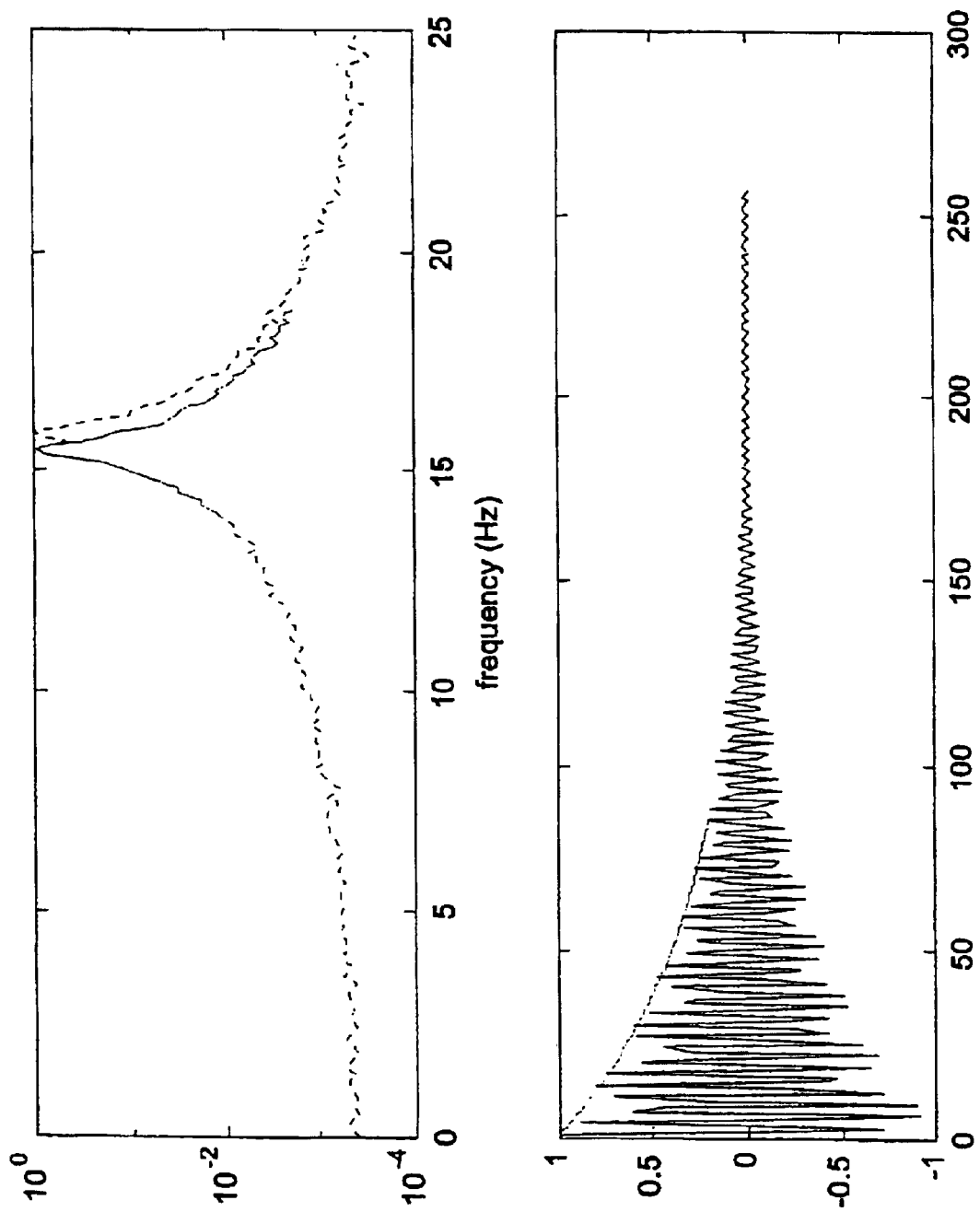
FIG. 4 illustrates case 2 with closely spaced modes. Top: Partial identification of SDOF auto spectral density. Bottom: Corresponding free decay with damping envelope.

The second case considered is the case of closely spaced modes as shown in FIG. 4. In this case, it is assumed that a reasonable part of the SDOF auto spectral density function can be identified on both sides of the peak of the considered mode. This is possible in the most cases by specifying a lower Ω-value as the MAC limit. In this case, the identification is also straight forward and the identified values of frequency and damping compares well with the exact values, see Tables 1 and 2.

Figure 5:
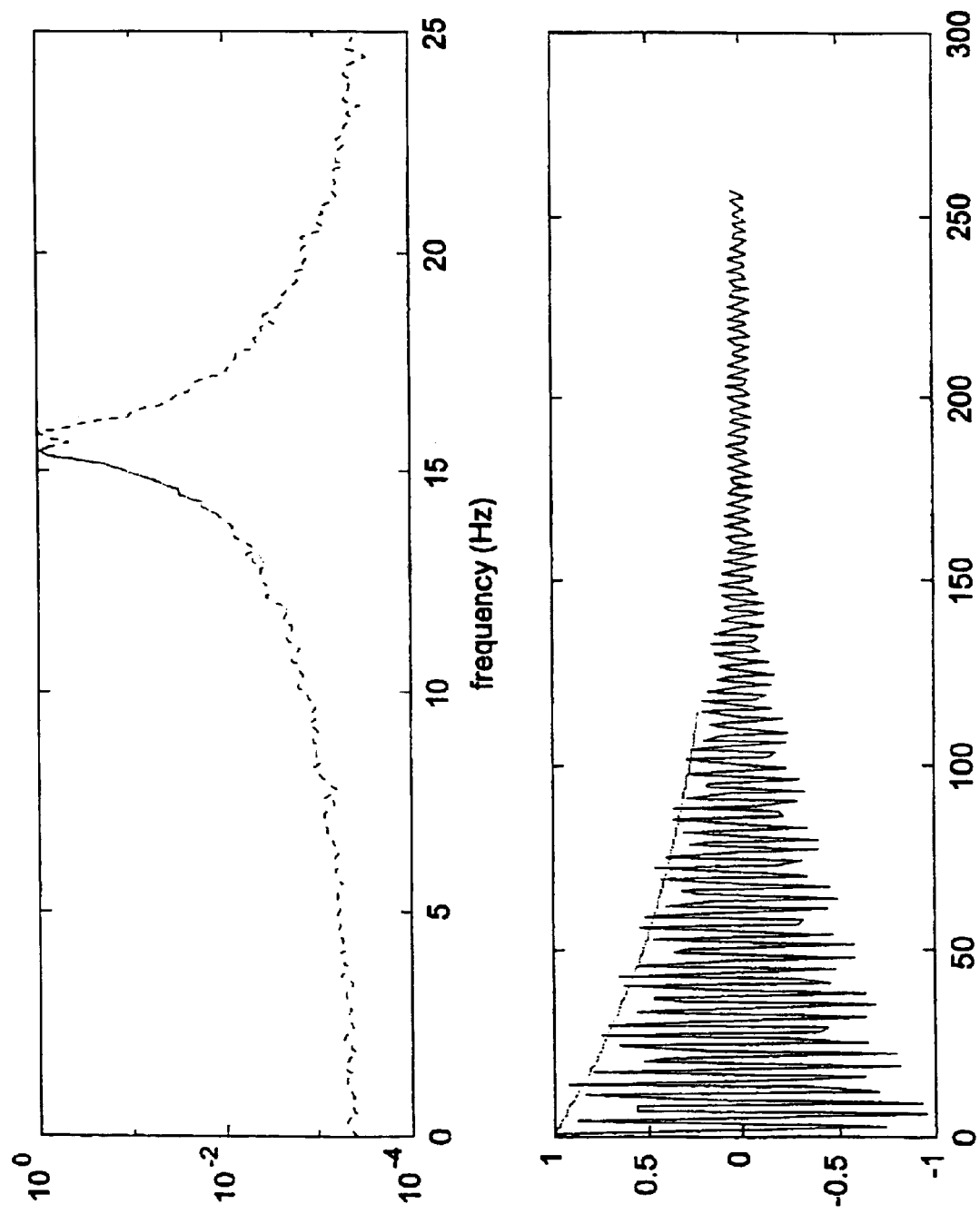
FIG. 5 illustrates case 3 with closely spaced modes, but where only a very limited part of the SDOF density is identified.

In the third case, it is assumed that only a quite small part of the SDOF auto spectral density function can be estimated. This can be the case if the spectral density is noisy due to limited data, or if noise is contaminating the signal. In this case, however, since the data are simulated data meeting all basic assumptions of the technique, the identified SDOF density function shown in FIG. 5 was obtained by using a rather high value of the MAC limit Ω. As it appears, since the number of active frequency lines in the spectrum is cut significantly, the free decay in the time domain becomes truncated to a degree where the damping becomes underestimated, Table 2.

Figure 6:
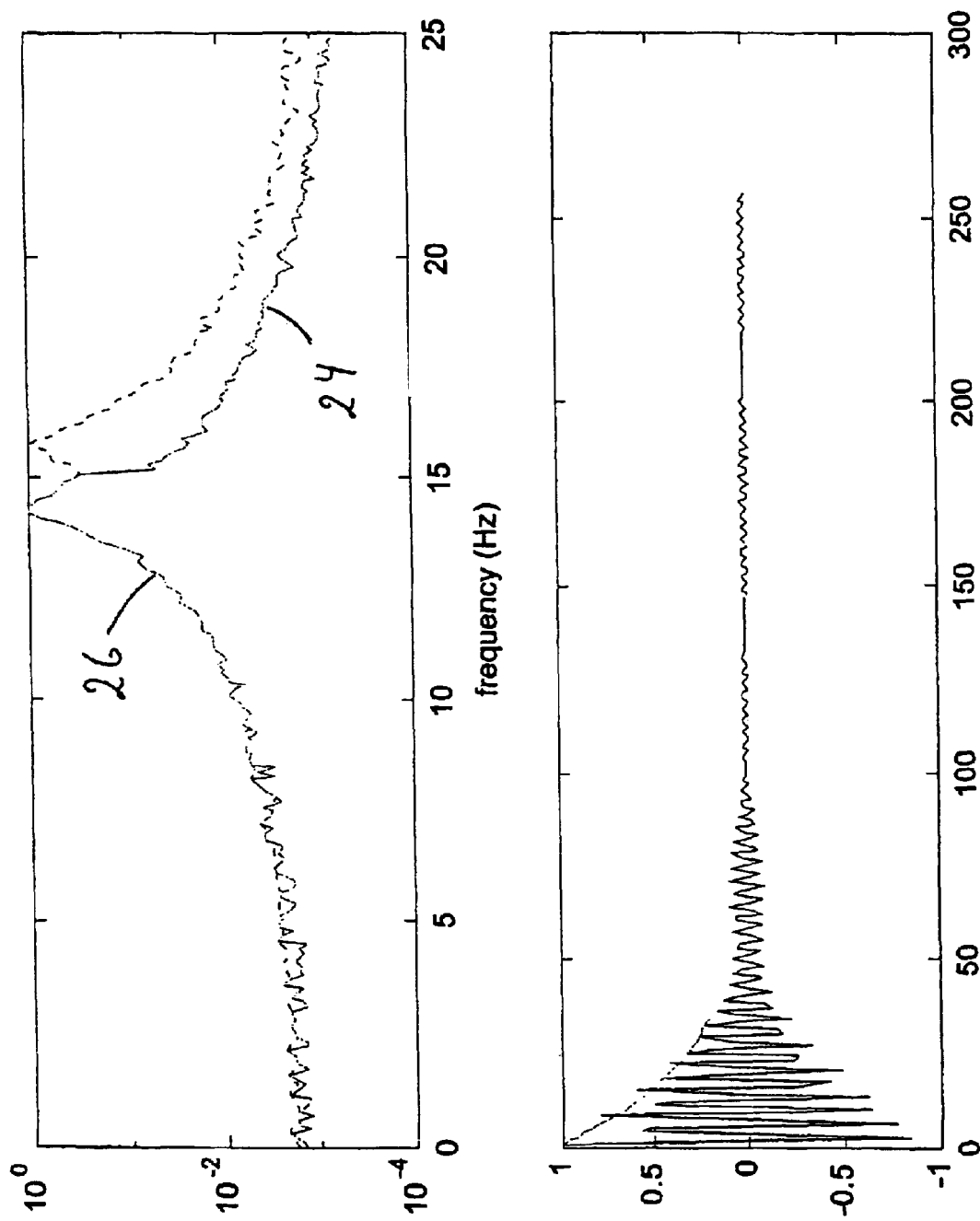
FIG. 6 illustrates case 4 with moderately spaced modes; mode shapes not orthogonal.

The fourth case, as shown in FIG. 6, illustrates the influence of non-orthogonal modes. In theory, to give exact results, the present method requires that the modes are orthogonal. All other cases considered in this paper have orthogonal modes. For the modes considered in case four, the MAC matrix is $$MAC = \begin{bmatrix} 1.0000 & 0.4226 \\ 0.4226 & 1.0000 \end{bmatrix}$$

In this case, the SVD still splits the spectral matrix into orthogonal components. This means, that even though the dominant singular value and the corresponding singular vector is a good estimate of the modal properties, the second singular value and the corresponding vector are not so closely related to the physics of the system. Thus, the right most part 24 of the SDOF auto spectral density function of the left mode 26 is badly estimated. Even though this is the case, the estimates of frequency and damping are still close to the exact values, Tables 1 and 2.

For the last considered case, case five, the loading is moderately correlated. In case of correlated input the modal decomposition performed by the method is approximate. In most practical cases however, like wind loads, wave loads or traffic loads, it is known that a moderate spatial correlation is present. Thus it is important to know the amount of influence such correlation might have on the results. In this case the correlation matrix between the two stochastic processes loading the system was $$C = \begin{bmatrix} 1.0000 & 0.4724 \\ 0.4724 & 1.0000 \end{bmatrix}$$

Figure 7:
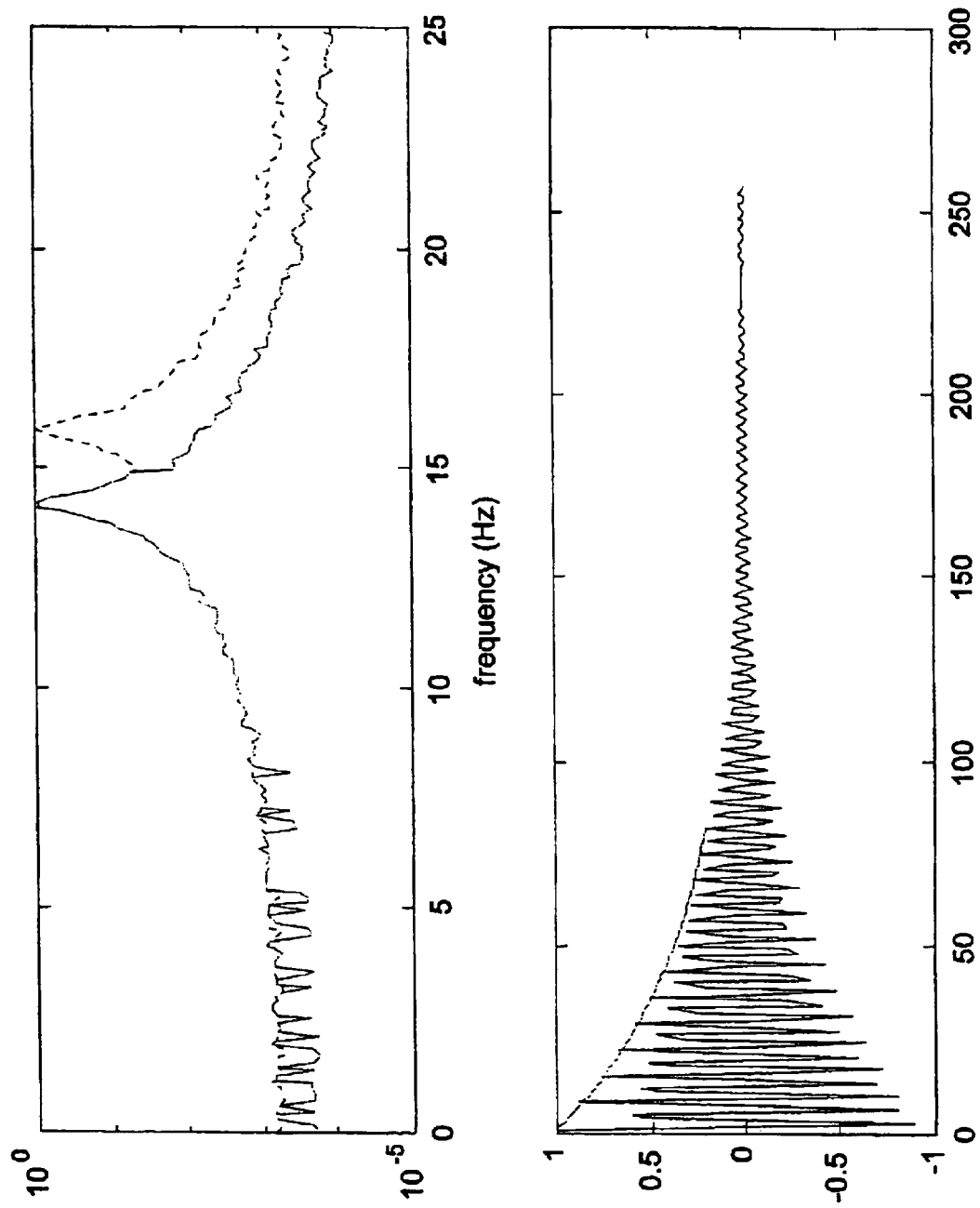
FIG. 7 illustrates case 5 with moderately spaced modes; correlated input.

The results of the estimation of the damping ratio of the first mode are shown in FIG. 7. Again, a certain distortion of the identified auto spectral density of the associated SDOF system in the overlapping region between the two modal peaks is seen. However, the influence is rather small, the estimation of frequency and damping is straight forward, and the estimated values are close to the exact values, Tables 1 and 2. Thus, moderate correlation does not seem to significantly influence the quality of the results.

Figure 8A:
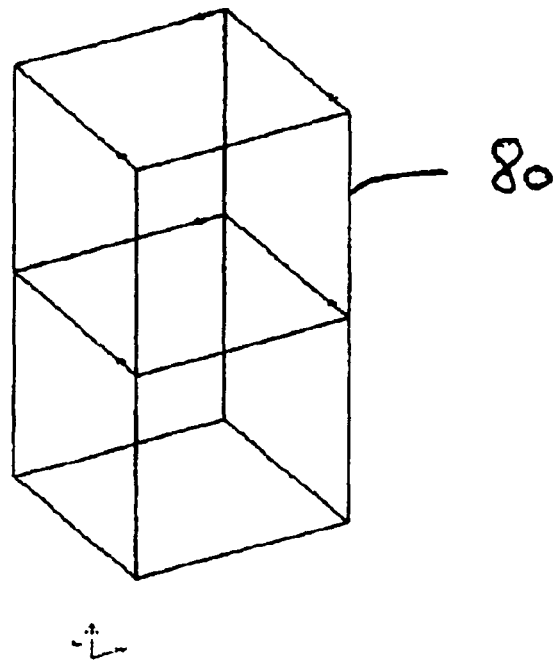
FIG. 8 illustrates the different vibrational modes for a building.
Figure 8B:
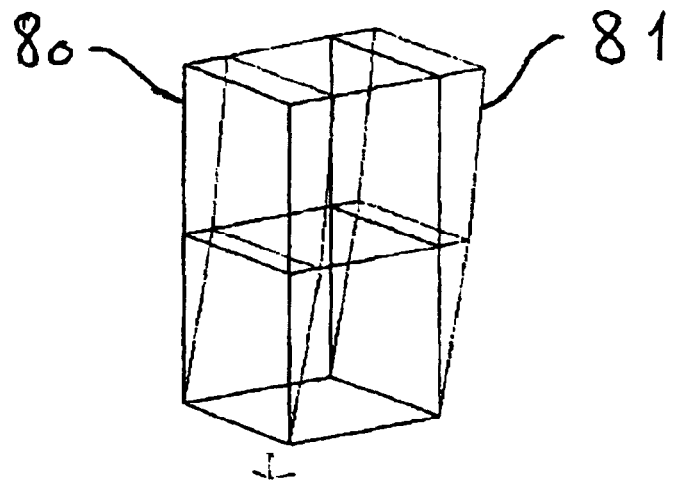
Figure 8C:
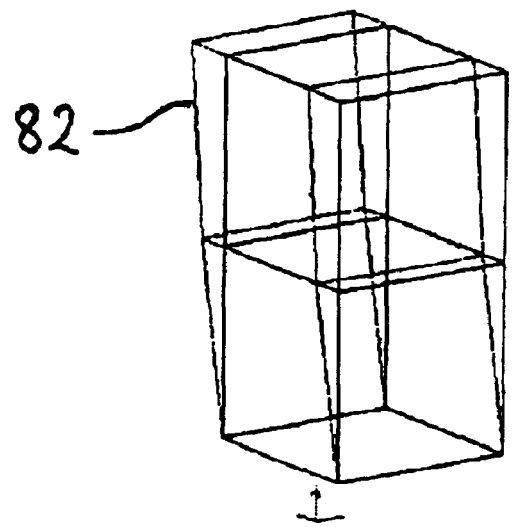
Figure 8D:
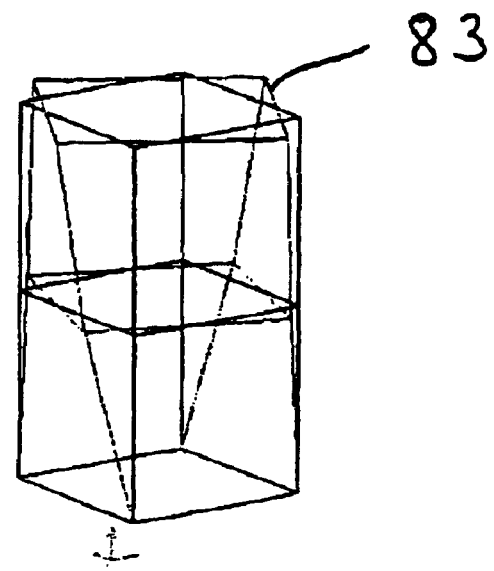
Figure 8E:
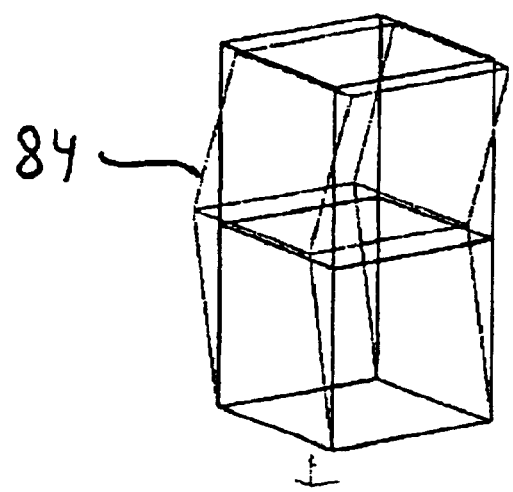
Figure 8F:
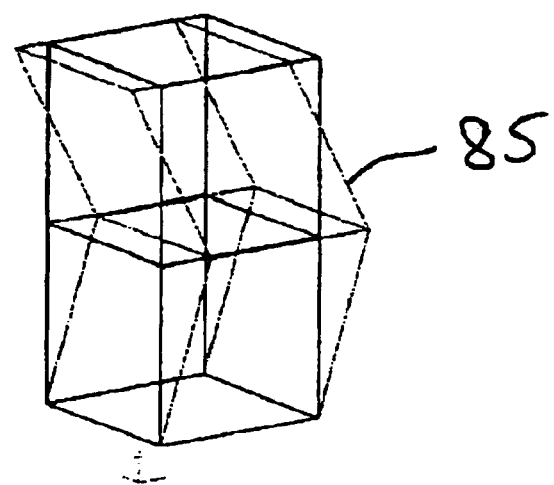

For illustration, the first five vibrational modes are shown in FIG. 8, where FIG. 8a shows the building 80 without vibrations, FIG. 8b shows the same building 80 with an overlay 81 illustrating the first vibration mode, FIG. 8c shows the same building 80 with an overlay 82 illustrating the second vibration mode, FIG. 8d shows the same building 80 with an overlay 83 illustrating the third vibration mode, FIG. 8e shows the same building 80 with an overlay 84 illustrating the fourth vibration mode, and FIG. 8f shows the same building 80 with an overlay 85 illustrating the fifth vibration mode.

Application of the Invention in Civil and Mechanical Engineering

The typical reason for applying the invention is to obtain information about the stiffness or mass of a structure.

The modal parameters are closely related to the mass and to the stiffness of a structure. The stiffer the structure, the higher the natural frequencies, and the heavier the structure, the lower the natural frequencies. The mode shapes reflect the mass and stiffness distribution, and the damping ratio reflects the internal damping properties of the structure.

Stiffness information can also be obtained for instance by measuring the relation between deformation and static loading, but the advantage of using the dynamic response is that the testing is much easier and in many cases the stiffness information obtained in this way is more accurate.

Once the stiffness of the structure has been obtained by the invention, one of the most important applications of this kind of stiffness information is for validation of numerical models and for quality control of parts produced in large numbers.

It is common to model the dynamic behaviour of structures by using numerical models like finite Element models. This is common practice in mechanical as well as in civil engineering. However, no matter how well developed the modelling tools are, still some uncertainties exist concerning material behaviour and structural joints. For this reason, it is of great practical value to validate these models by comparing the modelled modal parameters with the modal parameters obtained from experiments. If the model compares well, then the model is considered reliable, and can provide a good basis for simulating the behaviour of the structure under different loading conditions.

Examples of this kind of applications are typically expensive prototypes like satellites, rockets, aeroplanes, and large bridges, buildings and dams.

If a structural part is produces in large numbers, then it is often of great value to have a tool to check if every individual part has the same properties as the rest of the production. In this case the modal properties of the individual part are compared to the average modal properties of the production, and if they compare well, then the quality of the individual part has been documented. This kind of quality control is used on all kinds of production where the stiffness properties are important, or where minor flaws can be catastrophic, examples are wood members, concrete members, brake disks, engine blocks etc.

Stiffness information obtained by the invention can also be used for model updating. If for some reason a numerical model does not compare well with the measured modal parameters, it might be useful to improve the model so that the modal parameters of the model are closer to the observed parameters. This is especially the case if the model is to be used for response simulation.

This kind of model improvement is called model updating. Typical examples of this kind of model improvement is modelling of large engines and turbines, modelling of aeroplanes, rockets and satellites, and modelling of large civil engineering structures like large bridges, buildings and dams.

Until recently this kind of model improvement was only possible using traditional modal testing, i.e., when the structure can be loaded by forces that can be measured and controlled. However, since output-only modal analysis now is available, the output only modal identification can be performed on the large civil engineering structures since the modal parameters can be estimated from the measured responses only, and thus, better models can be achieved for these structures. This means that the response of these structures to dangerous natural loads such as storms and earth quakes can be modelled better and money can be saved or larger safety can be documented.

Stiffness information obtained by the invention might also be used for health monitoring of structures. Health monitoring is of importance whenever an expensive structure has to operate for a long time and where its mechanical health can be uncertain due to fatigue, wear or environmental influence such as frost and chemical reactions.

In such cases, it is of large importance to know when the health of the structure has decreased, and also to know when the health is so much decreased that the right moment for repair has appeared.

Nowadays, most of these health monitoring tasks are performed by visual or manual inspection. However, since the measuring equipment is becoming cheaper and more accurate, and since the facilities for transmitting this kind of information is already developed it is anticipated that the main part of this kind of monitoring can be automated.

A lot of research is going on in this area, and these years, several international conferences concern this technology. In the research community, it is commonly accepted, that one of the corner stones in such systems will be the automated modal identification using output only techniques.

Examples of applications can be large engines and turbines, aeroplanes, rockets, satellites and all kinds of large expensive structures like large bridges, buildings and dams. However in the long run also smaller structures like highways bridges might be monitored using this kind of technology. This opens a very large market for output only identification.

An important application could be the evaluation of structural safety after an earth quake where possible damages could exist. Then making a health evaluation immediately after the earth quake it can be documented that no significant structural changes has occurred, and the building can be authorised for use right away.

In case it has been detected, that the modal parameters have changed significantly, then it could be analysed what the reasons are for these changes. This is called damage detection.

If a numerical model has been calibrated (updated as described above) for the structure in its virgin state (when the structure was new), this model can be used for making systematic changes of the numerical model to see where in the structure possible stiffness changes can explain the observed changes of the modal parameters.

If a clear indication of the location of the damage can be made, substantial effort in finding the damage can be saved. This is especially true for structures where the main part of the structure is hidden like it is the case for office and apartment buildings.

If not only the location can be estimated, but also the type and the size of the damage can be estimated by performing these numerical simulations, the consequences for the safety of the structure can be estimated. This is of great importance for large civil engineering structures in earth quake active areas and areas with typhoons and Hurricanes. Thus, if this becomes possible, then immediately after an earth quake, the safety of the structure can be assessed, and the cost of the repair can be estimated.

Application of the Invention in Other Fields

The invention can be successfully used for analyses of any data that is the response of a system where the loading is unknown.

Any mechanical system can be analysed, it can be typical mechanical or civil engineering structures as described above, but can also be geological sites or parts of rock or earth, bio-mechanical systems, like human bodies, animal bodies and plants and parts hereof.

It can be used for analysis of the radiation of information that depends on the movements of any mechanical systems for instance radiation from planets and stars.

The invention can also be used for the analyses the response of micro-particles like atoms and molecules.

There are many fields in electronic engineering where the technique could be useful. In this engineering field identification has been extensively used, but emphasis has been on techniques where the input was known, on time-domain techniques, and on cases where the response is observed by only one signal (single output). In case of multiple output observations, the invention could have many applications in the electronic engineering fields in control and identification of systems. In particular, the invention could be used for identification of acoustic modes, i.e. the resonance frequencies of a room.

In economics the fluctuations of stocks and interest rates are often described by stochastic dynamic models. However, like for electronic engineering, the techniques used in economics are usually time domain techniques, and usually limited to one-output cases. For analysis of large sets of economic data, and especially for cases where several observation have been made (multi output), the invention could be a powerful tool for analysis of such data.

Implementation of the Invention

The method according to the invention is well suited to be implemented in a vibration analysing computer program, where the measured data from the object serve as an input and where the vibrational modal functions are calculated together with damping factors related to the single modes and corresponding natural frequencies.

What is claimed is:

1. Method for testing an object with respect to its vibration modes, comprising exciting vibrations in said object, measuring said excited vibrations by at least one vibration sensitive detector, and obtaining data quantitative of said excited vibrations of said object, wherein the method further comprises;

determining a spectral density function identifying in said spectral density function at least one auto spectral density function corresponding to a single degree of freedom system and obtaining a decomposition of said excited vibrations into mutually independent vibration modes.

2. Method according to claim 1, wherein the decomposition comprises the Singular Value Decomposition of the spectral density matrix at individual frequency lines.

3. Method according to claim 1, wherein said auto spectral densities are identified using the known modal assurance criterion (MAC).

4. Method according to claim 1, wherein said auto spectral function is transformed by Inverse Fourier Transform for determination of the vibration damping characteristics of said object and/or the natural frequency of the vibration mode.

5. Method according to claim 1, wherein the determination of said spectral density function comprises Fast Fourier Transform.

6. Computer program using a method according to claim 1.

7. A method according to claim 1, wherein said object is
biomechanical systems as the human body, animal body, plants, or parts thereof,
civil engineering structures such as buildings, bridges or dams,
structural parts such as wood members, concrete members, or metal members, or
members in mechanical structures like heavy machinery, rotating machinery, brake disks, engine blocks, turbines, aeroplanes, rockets, or satellites.

8. Method for testing an object with respect to its vibration modes, comprising exciting vibrations in said object, measuring said excited vibrations by at least one vibration sensitive detector, and obtaining data quantitative of said excited vibrations of said object, wherein the method further comprises determining a spectral density function identifying in said spectral density function at least one auto spectral density function corresponding to a single degree of freedom system and obtaining a decomposition of said excited vibrations into mutually independent vibration modes, wherein the determination of said spectral density function comprises Fast Fourier Transform, and wherein the determination of said spectral density function further comprises Random Decrement Transform of said data preceded by the Fast Fourier Transform.

9. Method according to the claim 8, wherein said the determination of said spectral density function comprises Random Decrement Transform at different trigger levels as a control for non-linearities of the system response.

10. Method for testing an object with respect to its vibration modes, comprising exciting vibrations in said object, measuring said excited vibrations by at least one vibration sensitive detector, and obtaining data quantitative of said excited vibrations of said object, wherein the method further comprises determining a spectral density function identifying in said spectral density function at least one auto spectral density function corresponding to a single degree of freedom system and obtaining a decomposition of said excited vibrations into mutually independent vibration modes, wherein said determination of said spectral density function comprises the derivative of the covariance function obtained by the Random Decrement Transform of the time data.

* * * * *